April 26, 1949.  G. JANSON, JR  2,468,074
MOTION TRANSLATING MECHANISM
Filed Nov. 7, 1947  2 Sheets-Sheet 1
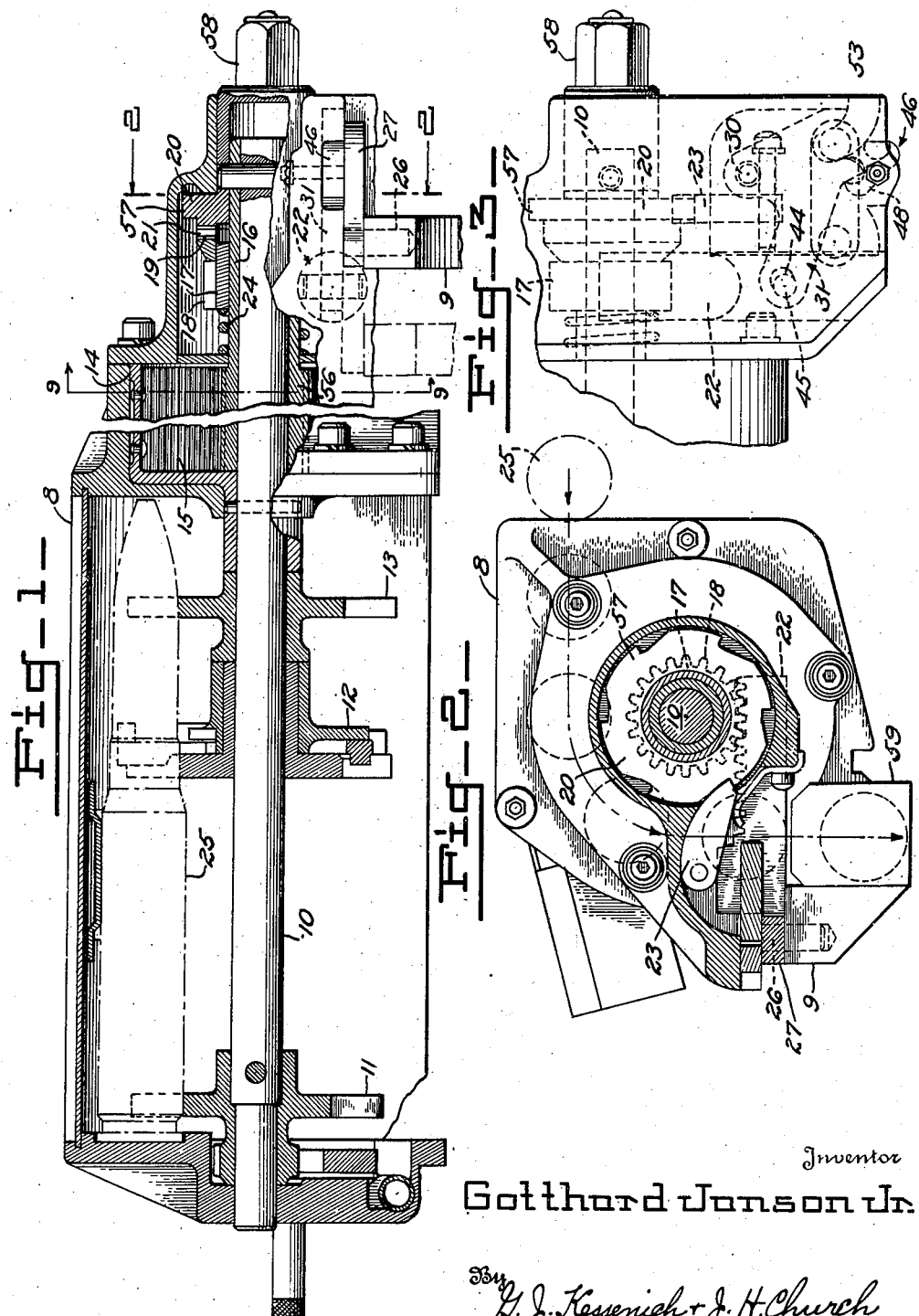
Inventor
Gotthard Janson Jr.
By G. J. Kessenich + J. H. Church
Attorneys April 26, 1949.  G. JANSON, JR  2,468,074
MOTION TRANSLATING MECHANISM
Filed Nov. 7, 1947  2 Sheets-Sheet 2
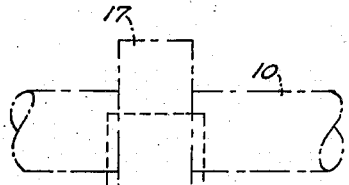
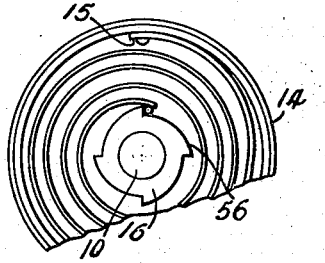
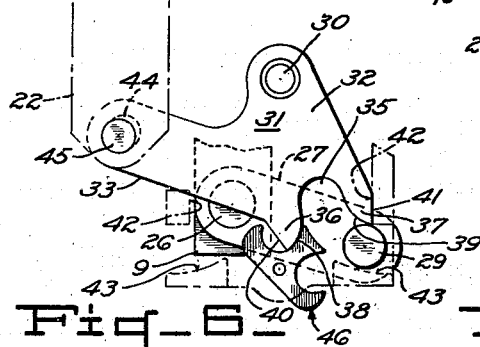
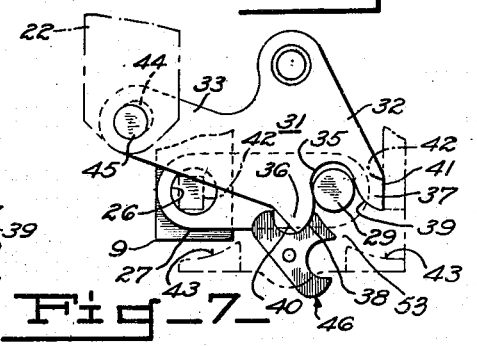
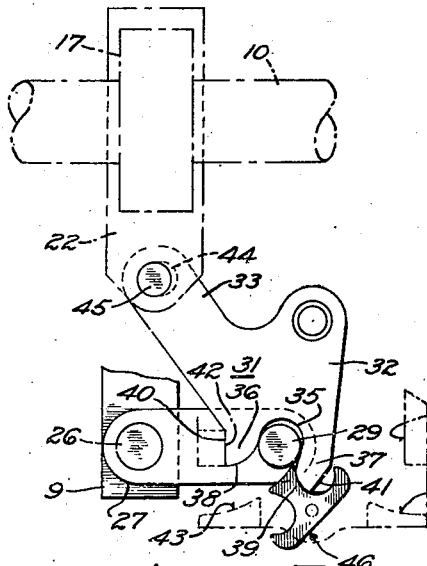
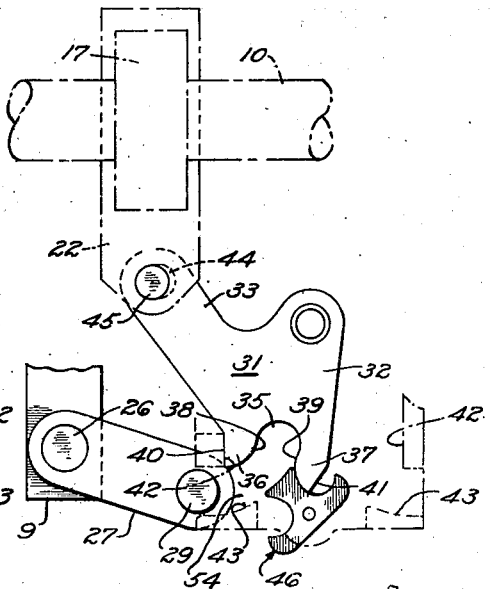
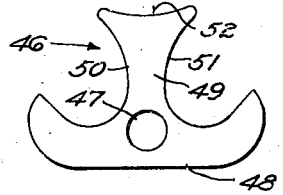
Inventor
Gotthard Janson, Jr.
By G. J. Kessenich & J. H. Church
Attorneys Patented Apr. 26, 1949

2,468,074

UNITED STATES PATENT OFFICE 2,468,074

MOTION TRANSLATING MECHANISM

Gotthard Janson, Jr., Lansing, Mich.

Application November 7, 1947, Serial No. 784,639

7 Claims. (Cl. 89—33)

(Granted under the act of March 3, 1883, as amended April 30, 1928; 370 O. G. 757)

The invention described in the following specification and claims may be manufactured and used by or for the Government for governmental purposes without the payment to me of any royalty thereon.

This invention relates to a mechanism for converting linear motion to rotary motion through a ninety degree change in linear motion.

An object of this invention is to produce a compact and direct means of transferring linear motion in one plane to linear motion in a second plane at right angles to the first plane.

A particular object of this invention is to provide improved means for tensioning a driving spring in a feeding mechanism for an automatic gun wherein the spring is wound the necessary amount on each recoil stroke of the gun regardless of any variation in the length of such recoil stroke.

The specific nature of the invention as well as other objects and advantages thereof will clearly appear from a description of a preferred embodiment as shown in the accompanying drawings in which:

Fig. 1 is a partial cross-sectional view of a 20 mm. automatic gun belt feed assembly which includes the motion translating mechanism of this invention.

Fig. 2 is a cross-sectional view taken along line 2—2 in Fig. 1.

Fig. 3 is a fragmentary top view of Fig. 1 showing the disposition of the motion translating mechanism in the belt feed assembly.

Fig. 4 is a partial view of Fig. 2 but showing in full the components of the motion translating mechanism in the position effected by overtravel on counter-recoil of the gun.

Fig. 5 is a view similar to Fig. 4 but showing the mechanism, without the shaft and ratchet actuating member, when the gun is in a zero recoil position.

Fig. 6 is a view similar to Fig. 4 but showing the mechanism when the gun is in a minimum recoil position.

Fig. 7 is a view similar to Fig. 4 but showing the mechanism when the gun is in an overtravel position on recoil.

Fig. 8 is an enlarged detail view of the oscillating guide of the motion translating mechanism.

Fig. 9 is a schematic fragmentary end view of the driving spring case with the driving spring and ratchet teeth of the sleeve member shown therein taken along the line 9—9 in Fig. 1.

In Figs. 1 through 3 there is shown a cartridge feeding device embodying the motion translating mechanism of this invention. Such feed device essentially comprises a substantially rectangular case 8 arranged to be mounted to a 20 mm. automatic gun (not shown). A central shaft 10 is rotatably mounted within case 8 and three sprockets 11, 12, and 13 are fixedly mounted on shaft 10 so as to rotate therewith. As best shown in Fig. 1, sprockets 11, 12, and 13 are designed to carry the individual rounds 25 of a conventional linked ammunition belt. Rotatably mounted on the front end of shaft 10 is a sleeve member 16 having a plurality of ratchet teeth 56 formed about one end thereof.

A cylindrical driving spring case 14 is fixedly secured to shaft 10 and encloses a clock-type spiral driving spring 15. The outer end of spring 15 is fixed to case 14 and the inner end is arranged to engage ratchet teeth 56 on sleeve member 16 as shown in Fig. 9. A ratchet actuating member 17 is rotatably mounted about shaft 10 and is provided with a peripheral segment of gear teeth 18. A plurality of ratchet teeth 19 are provided on the outer face of actuating member 17. A tensioning ratchet 20 is fixedly mounted on sleeve member 16 and is provided with ratchet teeth 21 which mesh with ratchet teeth 19. About the periphery of tensioning ratchet 20 there is provided a plurality of ratchet teeth 57 which are engaged by a pawl 23 and thereby prevent ratchet 20 from unwinding. A thrust spring 24 forces ratchet actuating member 17 against tensioning ratchet 20 to maintain contact therebetween. Tensioning ratchet 20 is also provided with a hexagonal boss 58 which projects out of case 8 as shown in Figs. 1 and 3 and thereby permits use of a suitable wrench for applying initial tension to driving spring 15.

A rack 22 mounted for reciprocable movement in case 8 engages gear teeth 18. In operation, the recoil of the gun causes rack 22 to rotate ratchet actuating member 17 which in turn rotates tensioning ratchet 20. Thus sleeve member 16 is rotated to wind driving spring 15. On the counter-recoil stroke of the gun, driving spring 15 unwinds and causes shaft 10 and consequently sprockets 11, 12, and 13 to rotate. Such movement advances rounds 25 one at a time into the gun. It is to be understood that while the gun itself recoils and counter-recoils little or no recoiling movement is imparted to the belt feed mechanism.

The foregoing is a brief description of the structure and operation of the belt feed assembly and is typical of a 20 mm. automatic gun. This invention, however, relates to the motion translating mechanism through which the recoil and counter-recoil movement of the gun is used to actuate rack 22 to impart rotary movement to the round-carrying sprockets.

A bracket 9 is fixedly secured to the side of a recoiling member 59 in the gun. A pin 26 is secured at one end within bracket 9 and the other end is pivotally engaged with a substantially rectangular link member 27. At one end of link member 27 there is provided a fixed follower stud 29. Pivotally mounted on a pin 30 which is suitably fixed within case 8, there is provided a rack arm member 31 comprising a body portion 32 and a handle-like portion 33 extending therefrom. At one end of body portion 32 a slot 35 is provided which forms on body portion 32 in conjunction with a pair of finger-like projections 36 and 37. Rack arm member 31 is disposed with respect to link member 27 in such manner that follower stud 29 is movably engaged in slot 35. Finger-like portions 36 and 37 are shaped to form arcuate edges 38 and 39, respectively, on the inner stud-engaging sides and to form straight edges 40 and 41 respectively on the outer sides. The interior of case 8 is provided with stop surfaces 42 disposed on either side of rack arm member 31 and arranged to limit the pivotal movement thereof. An elongated hole 44 is provided adjacent the end of handle-like portion 33 of rack arm member 31 and such hole receives a fixed stud 45 disposed at one end of rack member 22.

An oscillating guide member 46 is pivotally mounted in case 8 as by a pin 47 and is substantially T-shaped in outline as best shown in Fig. 8. Guide member 46 is provided with a cross-bar portion 48 and a stem portion 49. The ends of cross-bar portion 48 are arcuately formed and in conjunction with the sides of stem portion 49 which are also arcuately shaped, form arcuate cam surfaces 50 and 51. The amount of curvature of cam surfaces 50 and 51 is such that arcuate edges 38 and 39, respectively, on finger-like projections 36 and 37 will mate therewith during the pivotal movement of rack arm member 31. The end 52 of stem portion 49 is also arcuately formed. Arcuate tracks 53 and 54, respectively, are formed by arcuate surfaces 43 provided in case 8 on either side of guide member 46 in cooperation with arcuate end 52 of stem portion 49, rack arm arcuate slot 35, finger-like projections 36 and 37, and stop surfaces 42 as shown in Figs. 4 and 7.

As shown in Fig. 5, link member 27 is disposed horizontally when the gun is in a zero recoil position. At such time, follower stud 29 is engaged by the end of slot 35 in rack arm member 31. As the gun recoils, link member 27 moves along its axial centerline and thereby causes rack arm member 31 to pivot clockwise about fixed pin 30. Since arcuate edge 38 of finger-like projection 36 is in contact with cam surface 50, as shown in Fig. 5, the pivotal movement of rack arm member 31 cams guide member 46 pivotally counter-clockwise to the position shown in Fig. 6. At the end of the pivotal movement of guide member 46, the cam surface 51 thereon is in contact with arcuate edge 39 of finger-like projection 37. The movement of rack arm member 31 is limited by the contact of straight edge surface 40 with stop surface 42. During such movement, rack arm handle-like portion 33 moves rack 22 to actuate ratchet actuating member 17 whereby driving spring 15 is wound sufficiently to rotate the belt of ammunition during the counter-recoil of the gun to advance round 25 into a position to be chambered.

However, varying powder loads and other variable factors in the gun may affect the length of recoil movement thereof and thereby impart further movement to link member 27. The pivoting of guide member 46 has completed the formation of cam track 54 and the additional movement of link member 27 will cause follower stud 29 thereon to ride along such cam track. As a result, link member 27 will assume the position shown in Fig. 7. It can readily be seen that this overtravel movement of link member 27 will not effect any further movement of rack member 22.

Upon counter-recoil of the gun, link member 27 will first pivot back to the horizontal position shown in Fig. 6 and then cause rack arm member 31 and guide member 46 to assume, in the manner described above, the position shown in Fig. 5. Should the counter-recoil of the gun be of increased strength, however, link member 27 will pivot to the position shown in Fig. 4 due to the movement of follower stud 29 along cam track 54. Since rack arm member 31 is prevented from pivoting beyond its zero recoil position by stop surface 42, no additional movement will be imparted to rack 22. During the next cycle of operation of the gun, link member 27 will again assume the position shown in Fig. 5 before beginning its linear movement. As a result, driving spring 15 is wound a constant amount and each of rounds 25 equally advanced during each firing cycle of the gun.

Thus there is here provided a compact and direct motion translating mechanism especially adapted to operate a cartridge feeding assembly for an automatic gun of the type of the 20 mm. automatic gun M1. Such mechanism operates positively and accurately with almost a total absence of lash or slap and also permits overtravel of the gun recoiling parts in recoil or counter-recoil without any increase in the actuation of the feed assembly. Furthermore, the compactness of the mechanism of this invention permits utilization thereof in such places where space is at a premium.

I claim:

1. A mechanism for translating motion at right angles to the path of the original motion comprising, a link member arranged to pivot at one end thereof, means for imparting reciprocable linear movement to said link member, cam means arranged to change the path of movement of said link member at either end of said linear movement, a pivoting member engageable with said link member and arranged to be pivoted thereby, stop means arranged to limit the movement of said pivoting member, said pivoting member having a recess arranged to associate with said cam means when the movement of said pivoting member is limited by said stop means, a rack member engageable with said pivoting member and arranged for reciprocable movement thereby at right angles to said link member, and a swinging guide member arranged to be rotated by said pivoting member to a position wherein said cam means is operable to disassociate said link member from said pivoting member thereby allowing continued movement of said link member in the event of overtravel thereof of its reciprocating movement.

2. A mechanism for translating linear motion in one direction to linear motion in a direction at right angles to the first direction, the mechanism comprising, a housing arranged to support the mechanism therein, a bracket member having a pin extending into said housing, means for imparting reciprocable linear movement to said pin, a link member pivotally mounted at one end thereof to said pin, camming means on the opposite and free end of said link member, a pivoting member mounted in said housing for limited pivotal movement, said link camming means normally engageable with said pivoting member, a rack member suitably mounted to said pivoting member so as to receive a reciprocating linear movement at right angles to the path of said pin during the actuation of said pivoting member, and a swinging member pivotally mounted in said housing and arranged to guide said cam means out of engagement with said pivoting member upon cessation of movement of said latter member thereby permitting further movement of said link member without imparting such movement to said rack member.

3. A mechanism for translating linear motion in one direction to linear motion in a direction at right angles to the first direction, the mechanism comprising, a housing arranged to support the mechanism therein, said housing having a pair of stop surfaces therein, a movable pin extending into said housing, means for imparting reciprocable linear movement to said pin, a link member pivotally secured at one end thereof to said pin, camming means on the opposite and free end of said link member, a pivoting member mounted in said housing for pivoting movement between said stop surfaces, said pivoting member having a recess arranged to normally engage said link camming means, a rack member suitably mounted to said pivoting member so as to receive a reciprocating linear movement at right angles to the path of said pin during the actuation of said pivoting member, and a swinging member arranged to associate with said pivoting member recess for the formation of an arcuate cam track at the termination of the movement of said pivoting member.

4. A mechanism for translating linear motion in one direction to linear motion in a direction at right angles to the first direction, the mechanism comprising, a housing arranged to support the mechanism therein, said housing having a pair of stop surfaces and a pair of raised arcuate surfaces, a link member arranged for reciprocating linear movement, a cam follower on one end of said link member, a pivoting member mounted in said housing for pivoting movement between said stop surfaces, said pivoting member having a recess therein arranged to receive said cam follower, a rack member mounted to said pivoting member and arranged to receive a reciprocating linear movement at right angles to the path of said link member during the pivoting of said pivoting member, a swinging member having an arcuate surface arranged to cooperate with one of said raised arcuate surfaces and said pivoting member recess to form a cam track when said pivoting member is in either of its extreme pivoted positions, and a pair of finger-like members defined by said pivoting member recess, each of said finger-like members engageable with said swinging member for effecting rotation thereof.

5. In a belt feed mechanism for an automatic gun of the type provided with a recoiling gun member, a link member arranged to pivot at one of its end means joining said link member and the recoiling gun member, cam means arranged to divert the normal linear movement of said link member to an arcuate movement at either end of said normal movement, a pivoting member engageable with said link member and arranged to be pivoted thereby, stop means on either side of said pivoting member for limiting the pivoting movement thereof, said pivoting member having a recess therein arranged to associate with said cam means when the movement of said pivoting member is limited by said stop means, a rack member engageable with said pivoting member and arranged to reciprocate transversely of the recoiling gun member, and a swinging guide member arranged to be rotated by said pivoting member to a position wherein said cam means is operable to disassociate said link member from said pivoting member thereby allowing said link member to continue movement without corresponding movement of said rack member in the event of overtravel of the recoiling gun member in either direction.

6. In a belt feed mechanism for an automatic gun of the type provided with a recoiling gun member, a casing having a pair of raised arcuate surfaces, a longitudinal link member arranged for reciprocating linear movement and having a hole adjacent one end and a follower stud adjacent the other end, said link member pivotally associated at said hole end with the recoiling gun member, a pivoting member mounted in said casing, said pivoting member having a recess therein for engaging said link stud, an extending arm on said pivoting member, said arm having an elongated hole, a pair of stop surfaces in said casing on either side of said pivoting member for limiting the pivoting movement thereof, said recess having an arcuate interior surface arranged to cooperate with said raised arcuate surfaces to partially form a cam track when said pivoting member abuts either of said stop surfaces, a rack member having a pin thereon for engagement with said elongated hole in said pivoting member arm whereby said rack member is reciprocated transversely of the recoiling gun member, and a swinging guide member pivotally mounted in said casing and arranged to be rotated by said pivoting member to a position for completing said cam track whereby continued movement of said link member in either direction beyond said linear movement causes said stud thereon to ride in said cam track and thereby disengage from said pivoting member recess.

7. In a belt feed mechanism for an automatic gun of the type provided with a recoiling gun member, the combination of a plurality of sprocket members for feeding the belt into the gun, spring means for rotating said sprocket members in a belt feeding direction, a winding mechanism including a pawl and ratchet for providing tension to said spring means, a rack member arranged to actuate said winding mechanism, a link member arranged to pivot at one end thereof, cooperating means between said link member and the recoiling gun member, cam means arranged to divert the normal linear movement of said link member into an arcuate movement, a pivoting member engageable with said link member and arranged to be pivoted thereby, said pivoting member having an arcuate recess therein, stop means on either side of said pivoting member for limiting the pivoting member thereof, said pivoting member being operable to actuate said rack member, and a swinging guide member arranged to be pivotally rotated by said pivoting member, said guide member having an arcuate base for cooperation with said arcuate recess in said pivoting member to form an arcuate cam track whereby said link is pivoted from its linear travel upon overtravel of the recoiling gun member during recoil or counter-recoil thereby preventing over-tensioning or under-tensioning of said winding mechanism.

GOTTHARD JANSON, Jr.

No references cited.